May 16, 1967  N. N. AXELROD ET AL  3,320,500
TANTALUM ALLOY CAPACITOR

Filed Dec. 27, 1965  2 Sheets-Sheet 1

INVENTORS
N. N. AXELROD
H. D. GUBERMAN
N. SCHWARTZ
B. H. VROMEN

BY Edward M. Fink
ATTORNEY

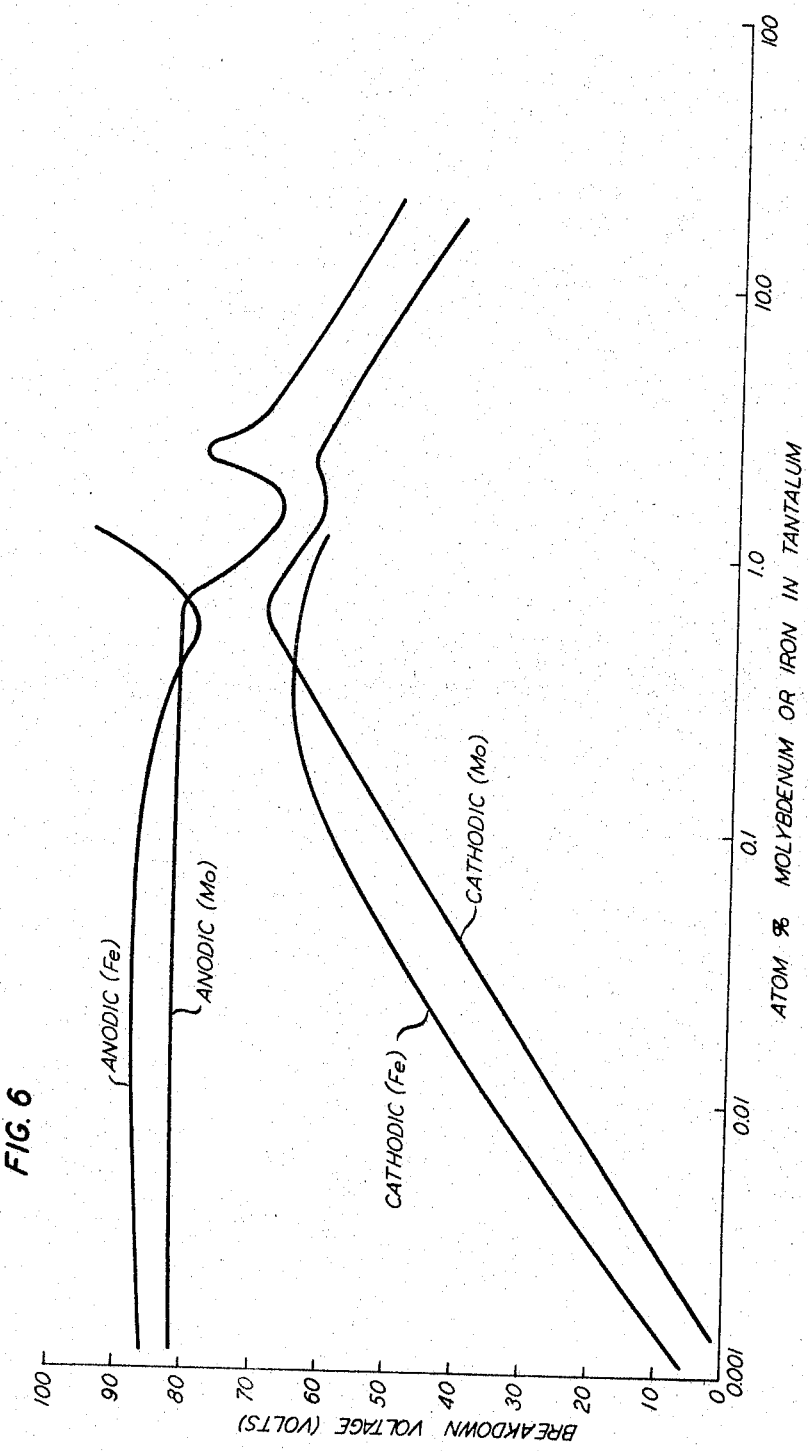

3,320,500
TANTALUM ALLOY CAPACITOR
Norman N. Axelrod, Summit, N.J., Herbert D. Guberman, Oak Ridge, Tenn., and Newton Schwartz, Morris Township, Morris County, and Benjamin H. Vromen, Plainfield, N.J., assignors to Bell Telephone Laboratories, Incorporated, New York, N.Y., a corporation of New York
Filed Dec. 27, 1965, Ser. No. 516,655
3 Claims. (Cl. 317—258)

This invention relates to a technique for the fabrication of a thin film capacitor including an alloy of tantalum as one of the electrodes, an oxide layer of the tantalum alloy as the dielectric and an electrically conductive counter-electrode, and also relates to capacitors produced by such techniques.

In recent years, there has been widespread interest in the electronics industry in a class of capacitors commonly referred to as "printed capacitors." These structures are typically constructed by depositing a layer of a film-forming metal upon a substrate, anodizing the deposited layer to form an oxide film, and finally depositing a counter-electrode in direct contact with the anodized film. The resultant capacitor is polar in nature and represents the first such device in which a semiconductive layer of manganese dioxide is eliminated, such having been a requirement in solid electrolytic capacitors prepared theretofore.

At that juncture in the chronological history of capacitor development, it was believed that the printed capacitor represented the ultimate objective in the development of capacitors employing an electrode comprising a film-forming electrode. Although this type of capacitor is eminently suited for use in printed circuitry, its importance in this use has resulted in a continuing effort to improve it. Accordingly, workers in the art have long sought a technique for increasing forward and reverse breakdown voltage and for minimizing the differential between these two values.

In accordance with the present invention, the prior art limitations are effectively overcome and in a preferred embodiment, a technique is described for the fabrication of a substantially non-polar capacitor of anodized construction. The inventive technique involves modifying the conventional procedure for the fabrication of printed tantalum capacitors by the use of an anode comprising tantalum alloyed with at least one metal selected from among the elements of Groups I(b), II(b), III(a), IV(b), V(b), VI(b) and VIII of the Periodic Table of the Elements (as shown in the 45th edition of the Handbook of Chemistry and Physics, page B-2, published by the Chemical Rubber Co., Cleveland, Ohio). Thus, the metals of interest herein may be selected from among copper, silver, gold, zinc, cadmium, mercury, aluminum, gallium, indium, thallium, titanium, zirconium, hafnium, vanadium, niobium, chromium, molybdenum, tungsten, iron, cobalt, nickel, ruthenium, rhodium, palladium, osmium, iridium, and platinum. The resultant devices manifest non-polar conduction properties, superior cathodic breakdown voltages, higher initial yields and better life test performance than any of the conventional prior art tantalum capacitors. The substantially non-polar nature of certain of these structures inherently suggests their use in circuits in which polarity changes occur, such as alternating-current circuits, and permits their operation in either direction at voltages ranging up to 30 volts.

The invention will be more readily understood by reference to the following detailed description taken in conjunction with the accompanying drawing wherein:

FIG. 6 is a graphical representation on coordinates of breakdown voltage in volts against alloy composition in atom percent showing the enhancement in breakdown voltage evidenced by capacitors produced in accordance with the present invention.

Figure 1:
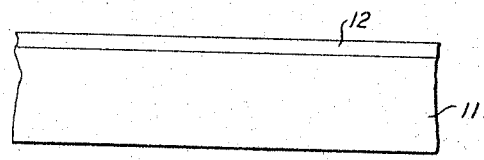
FIG. 1 is a cross-sectional view of a substrate with a layer of a tantalum alloy deposited thereon.

With further reference now to FIG. 1, there is shown a substrate 11 upon which a metallic pattern is to be produced in accordance with the present invention. The inventive technique contemplates the use of a substrate material which is able to withstand temperatures to which they may be subjected during the deposition stage of the processing. Glasses and glazed ceramics are particularly suitable in this use.

The first step in the inventive technique comprises cleansing the substrate by conventional techniques well known to those skilled in the art. Following the cleansing step, a layer of a tantalum alloy 12 is deposited by conventional procedures, as for example, cathodic sputtering, vacuum evaporation, vapor plating, et cetera, as described by L. Holland in "Vacuum Deposition of Thin Films," J. Wiley and Sons, 1956. This step may conveniently be accomplished by utilizing a tantalum cathode and wrapping thereabout strands of wire of the metal it is desired to alloy with tantalum or a cathode of the alloy. It has been found that metals suitable for use in the present invention may be selected from among the metal elements of Groups I(b), II(b), III(a), IV(b), V(b), VI(b) and VIII of the Periodic Table of the Elements, such elements having been set forth above. Further, it has been determined that in order to obtain the enhanced characteristics, alluded to above, in the resultant capacitors, the metal element must be present in the alloy in an amount ranging from 0.01 to 20.0 atom percent with a preferred range of from 0.1 to 20 atom percent. The noted limits are dictated by practical considerations, namely, the degree of enhancement in characteristics beyond those points. It has been found that the use of amounts less than the noted minimum fails to materially improve operating characteristics beyond those of capacitor grade tantalum. On the other hand, excesses beyond the noted maximum result in a definite degradation of device properties. The preferred range results in substantially non-polar devices as well as in superior breakdown characteristics.

For the purposes of the present invention, the minimum thickness of the layer deposited upon the substrate is dependent upon two factors. The first of these is the thickness of the metal which is converted into the oxide form during the subsequent anodizing step. The second factor is the minimum thickness of unoxidized metal remaining after anodization commensurate with the maximum resistance which can be tolerated in the tantalum alloy electrode. As described herein, the preferred minimum thickness of the tantalum alloy electrode is approximately 2,000 Angstroms. There is no maximum limit on this thickness.

For anodizing voltages up to 130 volts, it has been found that an alloy deposit of at least 4,000 Angstroms is preferred. It is considered that of this 4,000 Angstroms a maximum of approximately 1,000 Angstroms is converted during the anodizing step leaving approximately 3,000 Angstroms as the electrode thickness.

Figure 2:
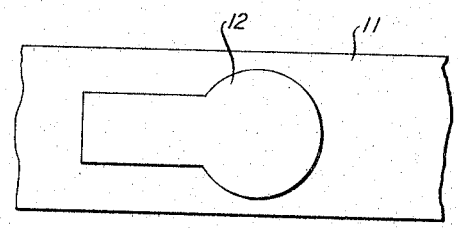
FIG. 2 is a plan view of the body of FIG. 1 after photoengraving and etching to form a desired pattern.

Following the deposition step, a desired pattern is formed in layer 12 so as to completely remove certain portions thereof, as for example, by photoengraving. Any one of the well-known conventional photoengraving procedures may be used to effect this result (see "Photoengraving," Groesbeck, Doubleday Page and Company, 1924). FIG. 2 is a plain view of substrate 11 showing the pattern resulting from the removal of portions of layer 12.

Figure 3:
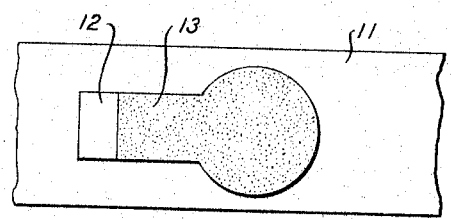
FIG. 3 is a plan view of the body of FIG. 2 after anodization.

Following the photoengraving step, alloy layer 12 is anodized in an appropriate electrolyte, so resulting in an oxide film 13, shown in FIG. 3. Suitable electrolytes for this purpose are phosphoric acid, citric acid, et cetera.

Figure 4:
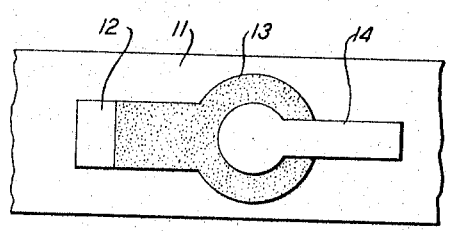
FIG. 4 is a plan view of the body of FIG. 3 after the deposition thereon of a counter-electrode.
Figure 5:
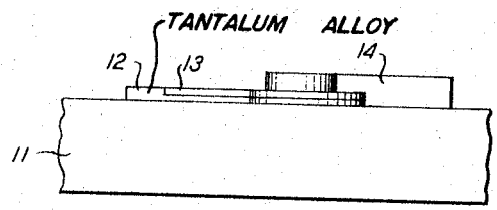
FIG. 5 is a cross-sectional view of the body of FIG. 4.

The last step in the fabrication of a capacitor in accordance with this invention is the application of a counter-electrode 14, shown in FIG. 4, in contact with the oxide film 13. Any suitable method for producing an electrically conductive layer on the surface of the oxide layer is suitable, as for example, vacuum evaporation. A cross-sectional view of the finished assembly is shown in FIG. 5.

Several examples of the present invention are described in detail below. These examples are included merely to aid in the understanding of the invention, and variations may be made by one skilled in the art without departing from the spirit and scope of the invention.

*Example I*

A glass slide, approximately one inch in width and three inches in length was cleaned ultrasonically by conventional techniques. Thereafter, a tantalum-molybdenum alloy was deposited upon the cleansed substrate by sputtering techniques. The cathode employed was a 6" x 6" x 0.50" piece of capacitor grade tantalum obtained from commercial sources, on strand of molybdenum, obtained from commercial sources, having a diameter of 0.005 inch being wound upon said cathode. Sputtering was effected from both sides of the cathode at 4,000 volts and 50 milliamperes in 30 microns of argon for 60 minutes, so resulting in an alloy layer 4,000 Angstroms thick. The resultant layer contained 0.19 atom percent molybdenum.

Thereafter, a 15 capacitor pattern was established by means of conventional photoengraving techniques. The capacitor pattern was then anodized in 0.01 weight percent citric acid water solution at a constant current density of one milliampere/cm.$^2$ until the voltage was 130 volts and then the anodization was continued at constant voltage. Thirty minutes after achieving constant voltage, the capacitor was removed from the anodizing medium and etched in 0.01 weight percent aluminum chloride in absolute methanol for five seconds with the alloy at a positive potential of 90 volts. Following, the slide was rinsed in alcohol, rinsed in water and re-anodized in citric acid at 130 volts for 30 minutes. Upon completion of the anodization, the slide was rinsed in distilled water and dried. Finally, gold counter-electrodes were evaporated by conventonal procedures to complete the capacitors. In order to determine breakdown voltage, a measurement technique was used which distinguished between charging current and leakage current. In order to obtain a constant charging current, the rate of rise of voltage was kept at a constant value of ±1 volt/sec. and the noncatastrophic breakdown was defined to occur at twice the value of the constant charging current. The anodic breakdown voltage was 85 volts and the cathodic breakdown voltage was 60 volts.

For comparative purposes, the procedure was repeated with several different alloying elements as well as in the absence thereof. The results of these examples, in the interest of brevity, have been set forth in the following Table I.

TABLE I

| Example No. | Alloying Element | Atom Percent | Number of Strands | Diameter | Anodic Breakdown Voltage | Cathodic Breakdown Voltage |
|---|---|---|---|---|---|---|
| 1 | Mo | 0.19 | 1 | 0.005 | 85 | 60 |
| 2 | Mo | 0.38 | 1 | 0.010 | 78 | 60 |
| 3 | Mo | 0.76 | 2 | 0.010 | 83 | 70 |
| 4 | Mo | 1.14 | 3 | 0.010 | 72 | 64 |
| 5 | Mo | 1.52 | 4 | 0.010 | 68 | 62 |
| 6 | Mo | 1.90 | 5 | 0.010 | 86 | 66 |
| 7 | Mo | 2.28 | 6 | 0.010 | 79 | 64 |
| 8 | Mo | 2.96 | 7 | 0.010 | 72 | 57 |
| 9 | Mo | 3.04 | 8 | 0.010 | 70 | 53 |
| 10 | Mo | 6.9 | 2 | 0.150 | 61 | 49 |
| 11 | Mo | 21 | 6 | 0.150 | 54 | 44 |
| 12 | | | 0 | | 85 | 5 |
| 13 | Fe | 0.05 | 1 | 0.009 | 94 | 51 |
| 14 | Fe | 0.11 | 2 | 0.009 | 85 | 62 |
| 15 | Fe | 0.16 | 3 | 0.009 | 90 | 51 |
| 16 | Fe | 0.21 | 4 | 0.009 | 86 | 66 |
| 17 | Fe | 0.26 | 5 | 0.009 | 82 | 66 |
| 18 | Fe | 0.37 | 7 | 0.009 | 81 | 66 |
| 19 | Fe | 0.42 | 8 | 0.009 | 79 | 63 |
| 20 | Fe | 0.47 | 9 | 0.009 | 80 | 70 |
| 21 | Fe | 0.52 | 10 | 0.009 | 81 | 65 |
| 22 | Fe | 1.26 | 24 | 0.009 | 96 | 61 |
| 23 | Ni | | 1 | 0.020 | 70 | 33 |
| 24 | Ni | | 2 | 0.020 | 68 | 38 |
| 25 | Ni | | 4 | 0.020 | 71 | 46 |
| 26 | Ni | | 8 | 0.020 | 69 | 49 |
| 27 | Cu | | 1 | 0.020 | 79 | 50 |
| 28 | Cu | | 2 | 0.020 | 80 | 47 |
| 29 | Cu | | 4 | 0.020 | 78 | 51 |
| 30 | Cu | | 8 | 0.020 | 80 | 49 |
| 31 | Al | | 1 | 0.030 | 96 | 23 |
| 32 | Al | | 2 | 0.030 | 87 | 23 |
| 33 | Al | | 3 | 0.030 | 82 | 39 |
| 34 | Al | | 6 | 0.030 | 85 | 39 |
| 35 | W | | 2 | 0.010 | 94 | 33 |
| 36 | W | | 4 | 0.010 | 86 | 45 |
| 37 | W | | 8 | 0.010 | 78 | 34 |
| 38 | W | | 16 | 0.010 | 75 | 48 |
| 39 | Ti | | 2 | 0.010 | 75 | 18 |
| 40 | Ti | | 4 | 0.010 | 6 | 21 |
| 41 | Ti | | 6 | 0.010 | 1800 | 34 |
| 42 | Ti | | 8 | 0.010 | 97 | 51 |
| 43 | V | | 2 | 0.010 | 98 | 66 |
| 44 | V | | 4 | 0.010 | 65 | 45 |
| 45 | V | | 8 | 0.010 | 63 | 41 |
| 46 | V | | 16 | 0.010 | 101 | 68 |
| 47 | | | 0 | | 95 | 11 |
| 48 | | | 0 | | 87 | 14 |
| 49 | | | 0 | | 98 | 12 |
| 50 | | | 0 | | 90 | 14 |
| 51 | | | 0 | | 91 | 7 |

Analyses of the results set forth in Table I clearly indicate that the devices described herein manifest a significant improvement in cathodic breakdown voltages as compared with the conventional prior art tantalum device.

With reference now to FIG. 6, there is shown a graphical representation on coordinates of breakdown voltage in volts against alloy composition in atom percent showing variations in anodic and cathodic breakdown voltage as a function of varying molybdenum and iron concentrations in tantalum alloy capacitors. It will be noted that in both the Ta-Mo and Ta-Fe alloys the cathodic or reverse breakdown voltage evidences a significant increase over the compositional range of interest as contrasted with the conventional tantalum capacitor while the non-catastrophic anodic or forward breakdown voltage remains at a level within the general range of 50–100 volts, such being the required level for diverse device applications.

It is seen that the preferred alloying range is from 0.1 to 20 in the abscissa units. Such compositions not only show improved forward and reverse breakdown, but are substantially non-polar.

In order to demonstrate the improvement in yield manifested by the capacitors described herein the following procedure was employed. 105 tantalum and 105 tantalum-molybdenum alloy (0.6 atomic percent Mo) capacitors were fabricated in accordance with the procedure delineated above. A determination of critical yield was based upon the number of capacitors having leakage currents less than or equal to $1 \times 10^{-8}$ amperes after one minute at 75 volts, final yields being based upon the number of capacitors having less than a 10% change in capacitance after 16 weeks on life test performed at 50 volts and 85° C. The superiority of the devices fabricated in accordance with the invention as contrasted with prior art devices is evidenced by reference to Table II.

TABLE II

|  | No. of Capacitors | Initial Yield, Percent | Final Yield, Percent |
|---|---|---|---|
| Ta | 105 | 88 | 59 |
| Ta-Mo | 105 | 98 | 72 |

In still another series of examples, capacitors were formed by sputtering from capacitor grade tantalum cathodes, a tantalum-molybdenum alloy cathode (0.09 atomic percent molybdenum) and a tantalum-molybdenum alloy cathode (0.14 atomic percent molybdenum), and completing the devices as described above. Cathodic breakdown voltages for these devices are shown in Table III.

TABLE III

|  | No. of Capacitors | Cathode Breakdown Voltage (volts) |
|---|---|---|
| Ta only | 57 | 5-8 |
| Ta-Mo (0.09 at percent) | 50 | 45-60 |
| Ta-Mo (0.14 at percent) | 50 | 45-55 |

In another series of tests, 60 tantalum and 120 tantalum-molybdenum alloy (0.6 atomic percent molybdenum) capacitors were fabricated in accordance with the procedure delineated above. Final yield was determined by the number of capacitors having less than a 10% change in capacitance after 2 weeks on life test performed at −30 volts and 85° C. The results are set forth below in Table IV.

TABLE IV

|  | No. of Capacitors | Final Yield, Percent |
|---|---|---|
| Ta | 60 | 42 |
| Ta-Mo | 120 | 93 |

What is claimed is:
1. A thin film capacitor including a substrate member, a layer of tantalum alloyed with at least one metal selected from the group consisting of copper, silver, gold, zinc, cadmium, mercury, aluminum, gallium, indium, thallium, titanium, zirconium, hafnium, vanadium, niobium, chromium, molybdenum, tungsten, iron, cobalt, nickel, ruthenium, rhodium, palladium, osmium, iridium, and platinum, said metal being present in an amount ranging from 0.01 to 20 atom percent, an anodized layer of said tantalum alloy and an electrically conductive counter-electrode.

2. A capacitor in accordance with claim 1 wherein said metal is molybdenum.

3. A capacitor in accordance with claim 1 wherein said metal is iron.

References Cited by the Examiner

UNITED STATES PATENTS

| 2,299,288 | 10/1942 | Gray | 317—258 X |
| 2,993,266 | 7/1961 | Berry | 317—258 X |
| 3,203,793 | 8/1965 | Hand | 317—258 X |

LEWIS H. MYERS, *Primary Examiner.*

E. A. GOLDBERG, *Assistant Examiner.*